UNITED STATES PATENT OFFICE 2,450,710

PROCESS FOR OBTAINING AN ANTIANEMIA VITAMIN PRODUCT

Orson D. Bird and Stephen B. Binkley, Detroit, Mich., assignors to Parke, Davis & Company, Detroit, Mich., a corporation of Michigan No Drawing. Application October 4, 1943, Serial No. 504,954

5 Claims. (Cl. 195—2)

The invention relates to methods for the preparation of products having an activity of the so-called chick anti-anemia vitamin.

Considerable difficulty has been encountered when attempting to isolate or concentrate a chick anti-anemia activity from plant sources, because the impurities tend to go through the purification steps along with the vitamin.

An object of the present invention is to provide steps whereby the anti-anemia vitamin activity can be readily concentrated from plant sources by economical and improved procedures which lead to products having an activity which renders them suitable for commercial or practical therapeutic usefulness. By "plant sources" we mean vegetable tissues, such as alfalfa, or fungi, such for example as yeasts.

It has now been found that the anti-anemia vitamin activity is present in most, if not all, plant sources in a chemical form different from that which it has in animal tissues such as liver, spleen, kidney, stomach and the like. This can be proved by comparing chick anti-anemia active products concentrated from animal tissues with those concentrated from plant tissues, as to their property of stimulating growth of bacteria. It has also now been found that the concentrates from plant sources, e. g. yeasts, are essentially inert, so far as their property of stimulating bacterial growth is concerned, although they still possess anti-anemia potency for chicks, while the concentrates from animal tissues have both properties.

We have found that plant tissues and their aqueous extracts or concentrates can be subjected to enzymatic digestion, thereby imparting to them the microbiological property of stimulating bacterial growth, without destruction of the anti-anemia property.

It has further been discovered that the original microbiologically inactive product from plant tissues, which has anti-anemia potency, is apparently a relatively simple non-protein conjugate of the above-mentioned microbiologically active principle obtainable from animal tissue. We find that improved yields of these activities are obtainable from plants and fungi by first concentrating the activity as it exists in such material in conjugated form and either directly using the concentrated conjugate for prophylactic or therapeutic purposes, or thereafter breaking down the concentrated conjugate by enzymatic treatment and then using the product for its physiological properties. The active product from the enzyme treatment step is apparently unconjugated material and is preferably concentrated subsequent to the concentration and enzymatic treatment of the conjugated material. However, the invention also broadly includes the enzymatic treatment of crude and relatively little-concentrated conjugate, followed by concentration of the unconjugated material.

*Example*

1,000 lbs. of brewer's yeast extract is used. This extract in dry form is a product which can be obtained on the market and is prepared by making an aqueous extract of yeast cells (*Saccharomyces cerevisiae*), filtering the extract and evaporating it to dryness. The 1,000 lbs. of dry extract material is dissolved in about 700 gallons of water, the solution heated to the boiling point and then filtered through Super-Cel, a diatomaceous earth product. Sulfuric acid is carefully added to the filtered solution until it acquires an acidity of about pH 3.

125 lbs. of active carbon, such as the product known at "Norite SG-11," are added to the acidic solution, the mixture stirred for an hour, and then filtered. The filtrate is discarded. The charcoal is washed with water and then with 50% alcohol and the washings, containing various impurities, are discarded.

The activity is removed from the washed charcoal by eluting it a few times with 100 gallons of about 5% ammonia dissolved in 50% aqueous ethanol. The eluates are combined and concentrated to 20 gallons. They contain 20 kilograms of solids and about 75 or 80% of the original activity.

The combined and concentrated eluates are extracted exhaustively with butyl alcohol at approximately neutral pH, thereafter acidified to about pH 3 and extracted exhaustively with butyl alcohol. The butyl alcohol extracts contain impurities and are discarded in each case. The extracted aqueous residue containing the conjugate vitamin is freed from butyl alcohol by distillation, and then evaporated to dryness under vacuum at low temperature. About 20 lbs. of dry conjugate vitamin product are thereby obtained.

The conjugate vitamin activity of the concentrate is seemingly non-protein in nature since it is readily dialyzable through Cellophane No. 300, is not precipitated by heat in acid solution, by saturated ammonium sulfate at pH levels between 3 and 7, nor by trichloracetic acid.

The dry residue can be used directly by oral administration in an appropriate form, e. g. in aqueous solution, for its anti-anemia effect.

Thus, chicks which are from 3 to 5 weeks old and are suffering from anemia resulting from their being put on an anemia-producing diet of the type described in copending application of Pfiffner et al., Serial No. 477,998, filed March 4, 1943, now Patent No. 2,407,096, can be given about 180 milligrams orally every other day of the conjugate vitamin of this example and will thereby be cured of anemia in about 2 weeks. On the other hand, the conjugated vitamin can be enzymatically treated to give an unconjugated form of vitamin which is effective against anemia and which also promotes bacterial growth. The following is an example of such procedure and can be used to obtain the pure crystalline unconjugated vitamin.

The 20 lbs. of dry conjugated vitamin product described above is taken up in water, an enzyme such as that obtainable from kidney tissue or desiccated kidney tissue itself is added and the mixture digested for a day or two at about 37° C. For example, if desiccated kidney is used about 88 lbs. suffices for the 20 lbs. of conjugated product, or about 4 lbs. of kidney for 1 lb. of concentrate. Assays show that only relatively insignicant quantities of the vitamin activity are present in the kidney tissue used. The digestion mixture is thoroughly extracted with an acidic organic solvent, such as butyl alcohol which is acidified with mineral acid to a pH less than about 4, say pH 3. The acidic solvent substantially completely extracts the unconjugated vitamin from the digestion mixture. The butanol solution of the vitamin is concentrated by evaporation under reduced pressure and then cooled. The active fraction containing the vitamin precipitates from the cooled solution and is centrifuged or filtered off.

The solid vitamin product is taken up in a solvent, such as hot methanol, and the part which fails to dissolve consists of inactive material and is discarded. The methanol solution containing the vitamin is cooled and excess barium hydroxide solution added. A mixture of barium salts containing all of the vitamin precipitates out and is separated, for example by filtration. The barium salt mixture is treated with hot water and the insoluble fraction discarded. The cooled neutral aqueous filtrate containing the barium salt of the vitamin is then treated with a soluble zinc salt, such as zinc acetate, in order to precipitate the less soluble zinc salt of the vitamin. The zinc salt is filtered off and then converted to its soluble ammonium salt by treatment with ammonium oxalate solution which throws down a precipitate of insoluble zinc oxalate. The precipitate is filtered off and the filtrate brought to a definite acidity, thereby causing separation of the vitamin which is filtered off and dried. The free vitamin acid is thus separated in a substantially pure state.

If the utmost purity is desired, it may in some instances be necessary to repeat the purification over the barium and zinc salts, followed by the precipitation of the vitamin by acid. Alternatively, the substantially pure vitamin acid can be precipitated or crystallized from its chilled solutions, for example in a suitable solvent such as water, methanol, or a mixture of the two.

The product consists of yellowish orange colored clusters of microcrystals showing birefringence between crossed Nicol prisms. It is an acid. It is relatively insoluble in cold water and most organic solvents. Cold water dissolves approximately 0.01 mg. per cc., hot water approximately 1 mg. per cc., diluted methyl alcohol approximately 0.15 mg. per cc. and anhydrous butyl alcohol less than 0.005 mg. per cc. It is readily soluble in glacial acetic acid and in pyridine. It readily forms salts with bases, the sodium, ammonium and barium salts being readily soluble in water while the zinc, lead, mercury and silver salts are very insoluble. Cold half-saturated barium hydroxide solution dissolves approximately 2 mg. per cc. The compound contains only the elements of carbon, hydrogen, oxygen and nitrogen. It has a neutralization equivalent of approximately 135, as determined by direct titration with sodium hydroxide.

The new pure acid vitamin product is essential for the growth of bacteria such as L. casei and other bacteria. It will also promptly restore chicks to normal when they have been made anemic due to exclusion of the vitamin from their diet.

Sample analyses for the amorphous form of the acid are,

|  | Per cent | |
| --- | --- | --- |
| Carbon | 50.2 | 50.3 |
| Hydrogen | 5.3 | 5.4 |
| Nitrogen (Dumas) | 18.6 | 18.7 |
| Oxygen | 24.84 | 25.13 |
| Ash | 1.06 | 0.47 |

Analyses for the crystalline acid give no ash and slightly higher carbon and nitrogen percentages.

Bacterial growth activity, e. g. for lactobillus casei, is lost on treating the compound with acetic anhydride in pyridine, oxidation with ammoniacal silver solution, refluxing with thionyl chloride, oxidation with bromine water, treatment with diazomethane or with nitrous acid and by irradiation with ultraviolet light. Bacterial growth activity is not destroyed by semicarbazide or hydroxylamine. The product gives negative reactions in the biuret, murexide and Molisch tests.

The compound can be converted to its esters, e. g. its methyl ester or other alkyl ester in the usual manner with an alcohol, e. g. with methyl alcohol and hydrochloric acid. The methyl ester can be obtained as a crystalline derivative. The free acid can be regenerated from the crystalline methyl ester by alkaline hydrolysis.

The new acid product dissolved in N/10 sodium hydroxide solution does not perceptibly rotate the plane of polarized light at the D line of sodium when examined in 0.35% solution in a 1 decimeter tube.

The compound has a characteristic ultra-violet absorption spectrum. The spectrum in .005 N sodium hydroxide exhibits three absorption maximal very close to the wave lengths $256\mu$, $282\mu$, and $365\mu$, with $$E_{1cm.}^{1\%}$$

of approximately 542, 531, and 194 respectively, and absorption minima very close to the wave lengths $235\mu$, $268\mu$ and $333\mu$, with $$E_{1cm.}^{1\%}$$

of approximately 299, 476 and 135 respectively. Decreasing the pH of the solution decreases the extinction at the maxima at wave lengths $256\mu$ and $365\mu$ and increases the extinction at $282\mu$.

In the above example, instead of using butyl alcohol at the different pH values given to separate the conjugated vitamin from its impurities, one can use butyl acetate, cyclohexanone or similar solvent of the class aliphatic esters, ketones, and alcohols of relatively low molecular weight having only a slight miscibility with water. Also, instead of using butyl alcohol for extracting unconjugated vitamin from the enzymic digestion mixture, any other lower aliphatic alcohol may be used for that purpose.

Instead of using kidney tissue as the source of enzyme for splitting the conjugated vitamin, one can make use of stomach, liver, spleen, intestine and like animal glandular tissues or aqueous extracts of any or all of these which contain the enzymes. However, kidney, liver and intestinal tissues, or enzyme-containing extracts of these, are the best materials for use in the enzymic digestion step.

By using our improved process, it is now possible for the first time to economically employ yeast and like sources for obtaining purified and concentrated anti-anemia vitamin products.

What we claim is:

1. In a process for obtaining an anti-anemia vitamin product, the step which comprises enzymatically digesting a product of the class consisting of tissues from plant sources containing a conjugated vitamin product having anti-anemia potency for chicks and aqueous extracts of said tissues containing said conjugated vitamin product with a material of the class consisting of kidney, liver, intestines and extracts thereof containing an enzyme capable of liberating an unconjugated acid anti-anemia product.

2. In a process for obtaining an anti-anemia vitamin product, the step which comprises enzymatically digesting an aqueous extract of tissues from plant sources containing a conjugated vitamin product having anti-anemia potency for chicks with a material of the class consisting of kidney, liver, intestines and extracts thereof containing an enzyme capable of liberating an unconjugated acid anti-anemia product.

3. In a process for obtaining an anti-anemia vitamin product, the step which comprises enzymatically digesting an aqueous extract of yeast with a material of the class consisting of kidney, liver, intestines and extracts thereof containing an enzyme capable of liberating an unconjugated acid anti-anemia product.

4. In a process for obtaining an anti-anemia vitamin product, the step which comprises enzymatically digesting an aqueous extract of yeast with kidney tissue thereby obtaining an unconjugated acid anti-anemia vitamin product.

5. In a process for obtaining an anti-anemia vitamin product, the step which comprises enzymatically digesting an aqueous extract of yeast with desiccated kidney tissue thereby obtaining an unconjugated acid anti-anemia vitamin product.

ORSON D. BIRD.
STEPHEN B. BINKLEY.

REFERENCES CITED

The following references are of record in the file of this patent:

UNITED STATES PATENTS

| Number | Name | Date |
| --- | --- | --- |
| 1,611,531 | Kahn | Dec. 21, 1926 |
| 2,235,827 | Cregor | Mar. 25, 1941 |

FOREIGN PATENTS

| Number | Country | Date |
| --- | --- | --- |
| 13,722 | Great Britain | 1897 |

OTHER REFERENCES

Vitamins, Rosenberg, 1942, page 523.
Buchanan, "Agricultural and Industrial Bacteriology," 1930, pages 12 and 13.